United States Patent
Marsetti

[19]
[11] Patent Number: 6,076,655
[45] Date of Patent: Jun. 20, 2000

[54] LATERAL GUIDE FOR AN ACCUMULATION STATION, WITH DOUBLE ROW OF ROLLERS

[75] Inventor: Sergio Marsetti, Castelli Calepio, Italy

[73] Assignees: System Plast S.n.c. di Marsetti; C. Stampaggio Tecnopolimeri, Telgate, Italy

[21] Appl. No.: 09/118,611

[22] Filed: Jul. 17, 1998

[30] Foreign Application Priority Data

Jul. 21, 1997 [IT] Italy .................................. MI970553 U

[51] Int. Cl.⁷ .................................................. B65G 47/12
[52] U.S. Cl. .......................................................... 198/445
[58] Field of Search .................................. 198/445, 446, 198/447, 453, 836.1

[56] References Cited

U.S. PATENT DOCUMENTS

| | | | |
|---|---|---|---|
| 4,236,625 | 12/1980 | Smith et al. ............................... | 198/446 |
| 5,143,200 | 9/1992 | Fuller ........................................ | 198/453 |
| 5,911,306 | 6/1999 | Ferrari .................................... | 198/836.1 |

FOREIGN PATENT DOCUMENTS

| | | | |
|---|---|---|---|
| 0787666 | 8/1997 | European Pat. Off. ........ | B65G 21/20 |
| 637084 | 7/1983 | Switzerland .................... | B65G 39/18 |

*Primary Examiner*—Jospeh E. Valenza
*Attorney, Agent, or Firm*—Steinberg, Raskin & Liberchuk, P.C.

[57] ABSTRACT

A lateral guide for accumulation stations for transport lines for products in general, of the type comprising, for contacting the products, a plurality of rollers (5B) connected to upper and lower support elements (1, 2, 6, 7, 8), comprising on a first lateral face a first row (3) of rollers (5B), and on a second face, parallel to the first, a second row (4) of rollers (5B) free to rotate independently of the rollers of the first lateral face.

9 Claims, 1 Drawing Sheet

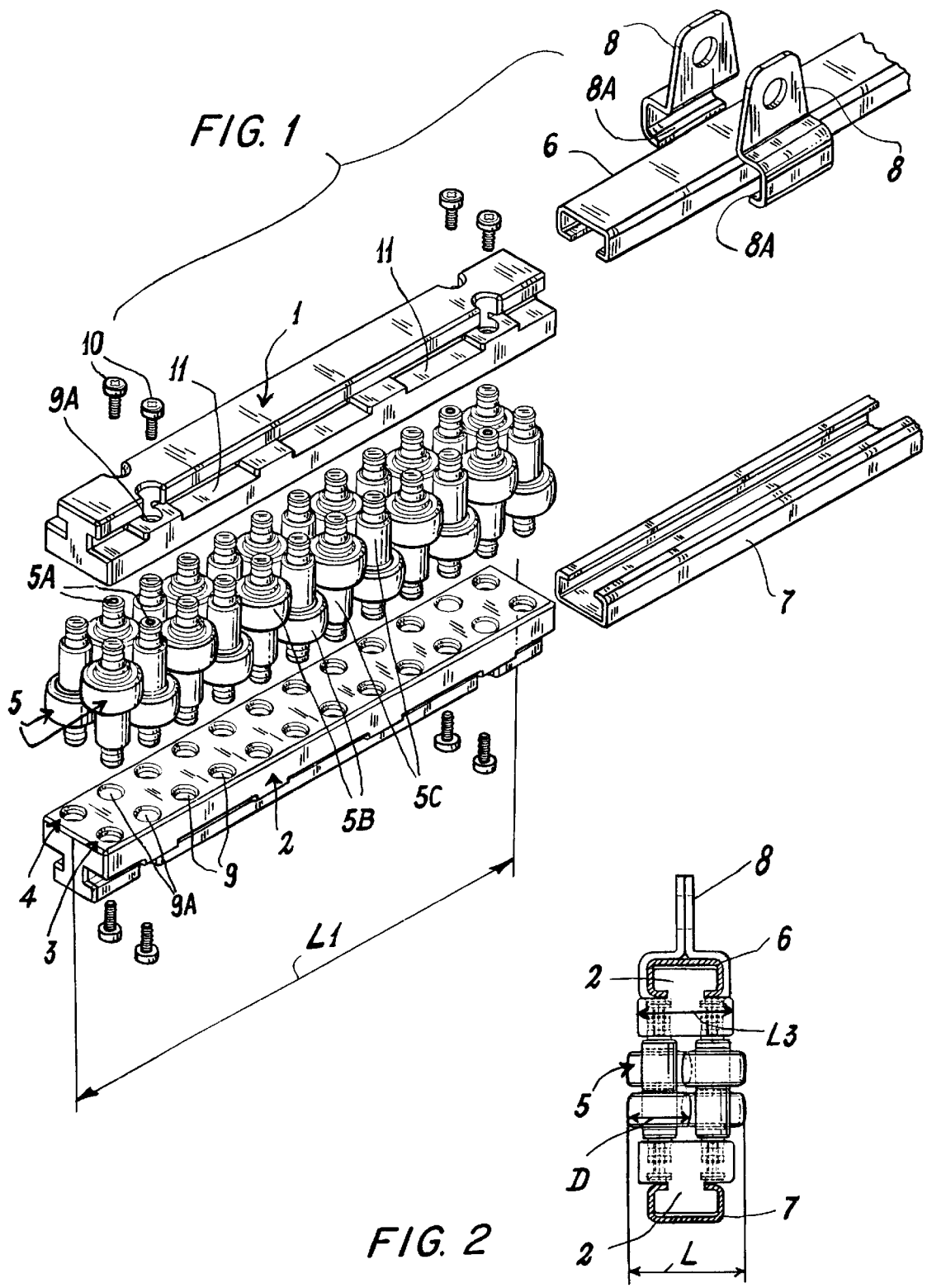

LATERAL GUIDE FOR AN ACCUMULATION STATION, WITH DOUBLE ROW OF ROLLERS

FIELD OF THE INVENTION

LATERAL GUIDE FOR AN ACCUMULATION STATION, WITH DOUBLE ROW OF ROLLERS

BACKGROUND OF THE INVENTION

This invention relates to a lateral guide, in particular of the type to be positioned at the centre of accumulation stations of transport lines for products in general, in particular bottles, in accordance with the pre-characterising part of the main claim.

In known transport lines, the handled products on arriving at an accumulation station are often divided into two parallel rows by guides positioned at the centre of the transport runway and by lateral walls of roller type. Known central guides must have a relatively small thickness and are formed either as a suitably cut plastic partition element or from suitably bent tubes.

OBJECTS AND SUMMARY OF THE INVENTION

It often happens that in making contact with the central guide and sliding along its walls, the products undergo damage in particular with regard to their external surface, which often presents scratches or abrasion marks.

An object of this invention is to provide a guide for accumulation stations for transport lines which, although having a thickness comparable with that of traditional guides, facilitates product sliding with no risk of damage to the external surface of the product.

This and further objects which will be apparent to an expert of the art are attained by a guide in accordance with the characterising part of the main claim.

BRIEF DESCRIPTION OF THE DRAWINGS

The invention will be more apparent from the accompanying drawing, which is provided by way of non-limiting example and on which:

FIG. 1 is an exploded view of a guide according to the invention;

FIG. 2 is a front view thereof.

DETAILED DESCRIPTION OF THE PREFERRED EMBODIMENTS

With reference to said figures the guide comprises an upper support part 1 and a lower support part 2 which are connected together by two rows 3 and 4 of rollers 5. The support parts are connected to an upper stiffening rail or channel 6 and a lower stiffening channel 7, and to fixing clamps 8.

The support elements 1 and 2 have a substantially flat first part comprising two parallel rows of equidistant seats 9 into which the free ends of the rollers 5 are snap-inserted. Side-by-side seats of one and the other row are positioned such that the relative rollers have their axes of rotation coplanar. Four of the seats comprise a hole or the passage one screws 10 which engage in a threaded hole 5A opening into the end of the rollers (these "holed" seats are indicated by 9A). From the flat part of the support elements there extends a part of T cross-section arranged to slide within the channel 6.

Between the T-shaped part and the flat part the support elements comprise equidistant recesses 11 arranged to house a lower end portion 8A of the clamps 8.

The rollers 5 all have the same form, they comprising a cylindrical body or pin 5C, at one end of which there is provided a cylindrical part 5B of greater diameter, constituting the actual roller. The ends of the cylindrical body are of conventional shape so as two be able to be snap-inserted into seats 9, 9A of the support elements.

The rollers are positioned such that the greater-diameter parts 5B are mutually offset, such that along one and the same row there alternate rollers with the cylindrical part 5B at the top and rollers with cylindrical part 5B at the bottom, and that a roller o a first row 3 having its cylindrical part 5B at the top lies to the side of a roller of the other row 4 which has its cylindrical part 5B in the opposite position. In this manner the support parts can have a width less than double the roller diameter D. The particular shape of the rollers and their particular arrangement result in guides having an extremely small width L, this being extremely important in transport lines, in which central guides of too great a width cannot be used.

The rails 7 can be rectilinear or curved, into the rails there being inserted a plurality of roller structures consisting of the support elements 1 and 2 connected together by rollers 5, until a guide of the required length is obtained.

In the case of curved rails the length L1 of the support elements 1, 2 is conditioned by the rail radius of curvature.

The clamps 8 enable the guide to be fixed to conventional supports (not shown) to maintain the guide in the required position.

It should be noted the described guide could also be used to form the lateral walls of accumulation stations, for example in the case of several runways arranged side by side.

What is claimed is:

1. A central lateral guide for accumulation stations for transport lines for products in general, of the type comprising, for contacting the products, a plurality of rollers (5B) connected to upper and lower support elements (1, 2, 6, 7, 8), characterised by comprising on a first lateral face a first row (3) of rollers (58), and on a second face, substantially parallel to the first, a second row (4) of rollers (5B) free to rotate independently of the rollers of the first lateral face.

2. A guide as claimed in claim 1, characterised in that the rollers comprise, for contacting the products, a greater diameter part (5B) provided at one end with a cylindrical body or pin (5C), the rollers being connected to the support parts (1, 2, 6, 7) in such a manner that the greater diameter part (5B) of a roller of one row (3) is positioned offset both to the next roller of the same row and to the corresponding roller of the adjacent row (4).

3. A guide as claimed in claim 2, characterised in that the axes of rotation of two side-by-side rollers (5B) of two different rows are coplanar.

4. A guide as claimed in claim 1, characterised in that the width (L3) of the support elements is less than double the diameter (D) of the rollers (5B).

5. A guide as claimed in claim 1, characterised in that the support elements comprise two channels (6, 7) into which support parts (1, 2) carrying the rollers are inserted.

6. A guide as claimed in claim 5, characterised in that a plurality of support parts (1, 2) are connected to the channels (6, 7).

7. A guide as claimed in claim 5, characterised in that the channels (6, 7) are curvilinear or rectilinear.

8. A guide as claimed in claim 1, characterised in that the rollers (5B) are snap-fitted to the support parts (1, 2), means (10) being provided to secure at least some of the rollers to said parts.

9. A guide as claimed in claim 1, characterised in that the support parts (1, 2) comprise equidistant recesses (11) to cooperate with clamps (8).

* * * * *